(12) United States Patent
Cha et al.

(10) Patent No.: US 10,909,871 B2
(45) Date of Patent: Feb. 2, 2021

(54) METHOD, APPARATUS, AND COMPUTER PROGRAM FOR OPERATING MACHINE-LEARNING FRAMEWORK

(71) Applicant: RIIID INC., Seoul (KR)

(72) Inventors: Yeong Min Cha, Seongnam (KR); Jae We Heo, Seoul (KR); Young Jun Jang, Seoul (KR)

(73) Assignee: RIIID INC.

( * ) Notice: Subject to any disclaimer, the term of this patent is extended or adjusted under 35 U.S.C. 154(b) by 130 days.

(21) Appl. No.: 15/627,188

(22) Filed: Jun. 19, 2017

(65) Prior Publication Data
US 2018/0336792 A1 Nov. 22, 2018

(30) Foreign Application Priority Data

May 19, 2017 (KR) ......................... 10-2017-0062551

(51) Int. Cl.
*G09B 7/06* (2006.01)
*G06N 20/00* (2019.01)
*G06N 7/00* (2006.01)
*G09B 5/06* (2006.01)

(52) U.S. Cl.
CPC .............. *G09B 7/06* (2013.01); *G06N 7/005* (2013.01); *G06N 20/00* (2019.01); *G09B 5/065* (2013.01)

(58) Field of Classification Search
CPC ......... G06F 17/30011; G06F 17/30675; G09B 5/02; G09B 7/06; G06N 20/00; G06N 7/005

See application file for complete search history.

(56) References Cited

U.S. PATENT DOCUMENTS

| | | | | |
|---|---|---|---|---|
| 5,832,108 A | * | 11/1998 | Fukita | G06K 9/66 382/159 |
| 6,461,166 B1 | * | 10/2002 | Berman | G09B 7/04 434/322 |
| 6,652,283 B1 | * | 11/2003 | Van Schaack | G09B 5/00 434/236 |
| 8,699,939 B2 | * | 4/2014 | German | G06Q 10/10 434/322 |
| 9,195,934 B1 | * | 11/2015 | Hunt | G06N 3/02 |
| 2002/0160347 A1 | * | 10/2002 | Wallace | G09B 7/06 434/322 |
| 2003/0139901 A1 | * | 7/2003 | Forman | G06F 17/18 702/179 |
| 2006/0075017 A1 | * | 4/2006 | Lee | G06Q 50/20 709/203 |
| 2007/0184426 A1 | * | 8/2007 | Packard | G09B 7/00 434/350 |
| 2010/0159432 A1 | * | 6/2010 | German | G06Q 10/10 434/350 |

(Continued)

*Primary Examiner* — Malina D. Blaise
(74) *Attorney, Agent, or Firm* — Adsero IP

(57) ABSTRACT

Disclosed is a method of providing user-customized learning content. The method includes: a step a of configuring a question database including one or more multiple-choice questions having one or more choice items and collecting choice item selection data of a user for the questions; a step b of calculating a modeling vector for the user based on the choice item data and generating modeling vectors for the questions according to each choice item; and a step c of calculating choice item selection probabilities of the user based on the modeling vectors of the user and the modeling vectors of the questions.

2 Claims, 1 Drawing Sheet

(56) References Cited

U.S. PATENT DOCUMENTS

| | | | | |
|---|---|---|---|---|
| 2013/0029307 | A1* | 1/2013 | Ni | G06N 20/00 434/322 |
| 2013/0263230 | A1* | 10/2013 | Gorodyansky | H04L 63/083 726/4 |
| 2013/0311409 | A1* | 11/2013 | Ye | G09B 7/00 706/12 |
| 2014/0279727 | A1* | 9/2014 | Baraniuk | G06N 20/00 706/11 |
| 2015/0242447 | A1* | 8/2015 | Ipeirotis | G06Q 30/0246 705/14.45 |
| 2016/0048772 | A1* | 2/2016 | Bruno | G06N 5/04 706/11 |
| 2016/0148120 | A1* | 5/2016 | Takahashi | G06K 9/00 706/12 |
| 2016/0217701 | A1* | 7/2016 | Brown | G09B 7/00 |
| 2016/0371663 | A1* | 12/2016 | Knuteson | G06Q 20/405 |
| 2017/0061324 | A1* | 3/2017 | Glass | G06N 7/005 |
| 2018/0247549 | A1* | 8/2018 | Martin | G09B 19/00 |
| 2018/0307969 | A1* | 10/2018 | Shibahara | G06N 3/0454 |
| 2019/0051204 | A1* | 2/2019 | Jang | G06F 16/9027 |

* cited by examiner

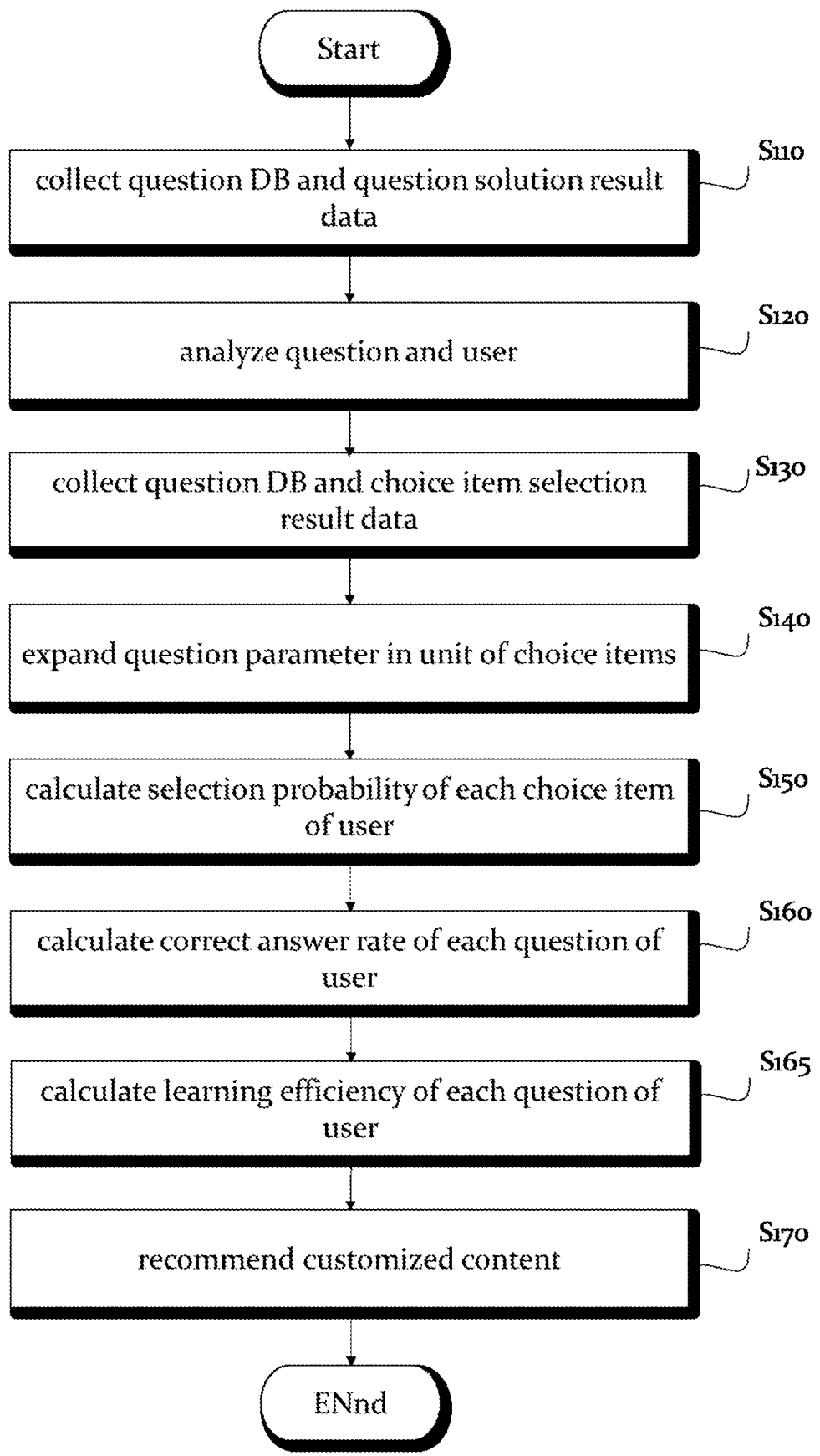

US 10,909,871 B2

METHOD, APPARATUS, AND COMPUTER PROGRAM FOR OPERATING MACHINE-LEARNING FRAMEWORK

BACKGROUND OF THE INVENTION

1. Field of the Invention

The present invention relates to a method of analyzing data and providing a customized content. More particularly, the present invention relates to a learning-data analysis method of applying choice item parameters of a question to expand collected question solution result data.

2. Description of the Prior Art

In general, educational content has been provided in a packaged form to date. For example, one workbook printed on paper has at least 700 questions, and online or offline lectures containing study materials that should be learned for at least one month are sold together in units of one or two hours.

However, since all students have different individual weak points and weak question types, the students need individually customized content rather than content in a packaged form. This is because selectively learning only a weak question type in a weak unit is much more efficient than solving all 700 questions in a workbook.

However, it is very difficult for students who are learners to identify their weak points by themselves. Further, in the conventional educational field, since private educational institutes or publishing companies analyze students and questions depending on subjective experience and intuition, it is not easy to provide questions optimized for individual students.

As described above, in the conventional educational environment, the learners have difficulty in providing individually customized content that elicits more efficient learning results, and the students may not feel a sense of accomplishment and rapidly lose interest in package-type educational content.

SUMMARY OF THE INVENTION

An aspect of the present invention is to solve the above problems. More specifically, an aspect of the present invention is to extract data required for analyzing a user and/or a question and to provide a data analysis framework that may efficiently use a parameter included in collected data.

In accordance with an aspect of the present invention, a method of providing user-customized learning content is provided. The method includes: a step a of configuring a question database including one or more multiple-choice questions having one or more choice items and collecting choice item selection data of a user for the questions; a step b of calculating a modeling vector for the user based on the choice item data and generating modeling vectors for the questions according to each choice item; and a step c of calculating choice item selection probabilities of the user based on the modeling vectors of the user and the modeling vectors of the questions.

According to an embodiment of the present invention, there is an effect of analyzing a question or a user by applying a choice item parameter selected by the user from collected user question solution result data and thus more precisely analyzing the user based on the same result data.

BRIEF DESCRIPTION OF THE DRAWINGS

The above and other aspects, features and advantages of the present invention will be more apparent from the following detailed description taken in conjunction with the accompanying drawings, in which:

FIG. 1 illustrates the operation of a data analysis framework according to an embodiment of the present invention.

DETAILED DESCRIPTION OF THE EXEMPLARY EMBODIMENTS

The present invention is not limited to the description of the following embodiments, and it is apparent that various modifications can be made without departing from the scope of the technical idea of the present invention. In the description of embodiments, a description of technical content widely known to those skilled in the art and having no direct relationship with the technical idea of the present invention will be omitted.

Meanwhile, in the accompanying drawings, the same elements are expressed by the same reference numerals. Further, in the accompanying drawings, some elements may be exaggerated, omitted, or schematically illustrated. This is to clearly describe the main subject of the present invention by omitting unnecessary description irrelevant to the main subject of the present invention.

Recently, as the supply of IT devices is expanded, data collection for analyzing users has become easier. When user data is sufficiently collected, user analysis may be more precise and content most suitable for the corresponding user may be provided.

Along with such a flow, the need for providing user-customized educational content is high particularly in an educational field.

For a simple example, when a user lacks a good understanding of "verb tenses" in English, learning efficiency can be further improved if the user is recommended questions including the concept of "verb tenses". However, in order to provide the user-customized educational content, it is required to precisely analyze each kind of content and the individual user.

In the prior art, a method was used in which specialists manually define concepts of corresponding subjects to analyze content and users and individually determine and tag what concept is included in each question of the corresponding subject. Thereafter, the ability of the learner is analyzed based on information on results generated by solving questions tagged for a particular concept by each user.

However, this method has a problem in that tag information is dependent on a person's subjectivity. Since the mathematically generated tag information cannot be mathematically assigned to questions without personal intervention, the reliability of resultant data cannot be high.

Accordingly, the data analysis server according to an embodiment of the present invention may exclude personal intervention from a data-processing process by applying a machine-learning framework to learning-data analysis.

Thereafter, users and/or questions may be modeled through a method of collecting question solution result logs of the user, configuring a multi-dimensional space including the user and the questions, assigning values to the multi-dimensional space based on whether the user solves the questions or not, and calculating a vector for each of the user and the questions.

Further, based on the user vector and/or the questions vector, the location of a particular user among all users, another user who can be clustered to be in a group of users similar to the particular user, similarity between the corresponding user and the other user, the location of a particular question among all questions, another question which can be clustered to be in a group of questions similar to the question, and similarity between the corresponding question and the other question may be mathematically calculated. In addition, users and questions may be clustered based on at least one attribute.

At this time, in the present invention, it should be noted that attributes or features included in the user vector and the question vectors cannot be restrictively construed.

For example, according to an embodiment of the present invention, the user vector may include a degree of understanding by the user of a predetermined concept, that is, understanding of the concept. Further, the question vector may contain information on what concepts are included in the question, that is, configuration of the concept.

However, the analysis of learning data through machine learning has some problems to be solved.

First, when only whether the answer is a correct answer or a wrong answer is used as a parameter for extracting a vector value based on a question solution result, question solution result data should be collected in a large quantity in order to provide an analysis result having predetermined reliability or higher.

Multiple-choice questions include choice items as well as the text of the question. However, according to the conventional method that reflects only whether the answer is a correct answer or a wrong answer based on analysis sources, when two students miss the same question but select different choice items, the effects of the corresponding question on the calculation of vector values of the two students may be the same.

In other words, in the case where a student misses a question by selecting a "gerund" choice item and the case where the student misses the question by selecting a "verb tenses" choice item, according to the conventional method, the effects of question solution result data of the corresponding student on calculation of vector values for the corresponding question may be the same, and the corresponding question solution result may be actually diluted without being sufficiently reflected in user analysis.

Accordingly, in order to acquire the result that the two students do not understand gerunds and verb tenses, respectively, it may be required to collect an amount of question solution result data sufficiently large to compensate for the dilution of the result.

That is, according to the conventional method of using only the result indicating whether the answer is a correct answer or a wrong answer as an input value for data analysis, a larger amount of question solution result data must be collected in order to analyze questions and users with reliability in a predetermined range or wider.

According to an embodiment of the present invention, the above problems can be solved. More specifically, according to an embodiment of the present invention, users and/or questions may be analyzed by applying a choice item parameter selected by the user from question solution result data. Accordingly, the same question solution result data may be expanded to the number of choice items of the corresponding question, and thus the user and the questions may be more precisely analyzed based on the same result data.

FIG. 1 is a flowchart illustrating a method of analyzing question solution result data according to an embodiment of the present invention.

Steps 110 and 115 correspond to steps of collecting learning data in a data analysis system and modeling a question and a user according to an embodiment of the present invention.

According to an embodiment of the present invention, in step 110, solution result data may be collected for all questions and all users.

More specifically, a data analysis server may configure a question database and collect solution result data of all users for all questions included in the question database.

For example, the data analysis server may establish a database for various available questions and collect solution result data through a method of collecting results of corresponding questions solved by users. The question database may include listening test questions and may have a text, image, audio, and/or video form.

At this time, the data analysis server may configure the collected question solution result data in the form of a list of users, questions, or results. For example, Y (u, i) refers to a result of question i solved by user u, and may have a value of 1 in the case of a correct answer and 0 in the case of a wrong answer.

The data analysis server according to an embodiment of the present invention may configure a multi-dimensional space including users and questions, assign values to the multi-dimensional space based on whether users solve the questions correctly or incorrectly, and calculate a vector for each user and question in step 120. At this time, it should be understood that features included in the user vector and the question vector are not specified.

In a data analysis framework according to an embodiment of the present invention, the reason for expressing the user and the question by modeling vectors is to precisely predict whether a particular user solves a particular question correctly or incorrectly.

However, as described above, the correct answer rate of the user for the question may be estimated through a method of collecting and analyzing user's correct and incorrect answer results, but may be estimated based on a selection probability of choice items.

For example, when a choice item selection probability of a first user for a particular problem is (0.1, 0.2, 0, 0.7), the user may select choice item no. 4 with a high probability. When the correct answer of the corresponding question corresponds to no. 4, it may be expected that the first user has a high probability of solving the question correctly.

Further, the difficulty level of the question may be estimated through a method of collecting and analyzing correct and incorrect answer results of all users, but may be estimated based on the choice item selection probability.

For example, when the choice item selection probability of users for a particular question having four choice items is (0.5, 0.1, 0.3, 0.6), the users have similar probability of choosing choice item no. 1 and choice item no. 4 in the second question, so that the second question may be classified as having a high difficulty level.

To this end, in the example of FIG. 1, the data analysis server may collect solution result data of all users including choice item elements selected by users in step 130. More specifically, the data analysis server may configure a question database and collect result data on choice items selected by all users for all questions included in the question database.

For example, the data analysis server may establish a database for various available questions, collect solution result logs through a method of collecting choice item selection results including choice items selected by users in corresponding questions, and additionally collect correct and incorrect answer results for the corresponding questions. At this time, the data analysis server may configure a list of users, questions, and choice items selected by corresponding users for corresponding questions.

Thereafter, the data analysis server may perform data analysis processing by expanding one question in the unit of choice items in step 140.

For example, when question i has four choice items, question i may expand to four parameters (i, 1) (i, 2) (i, 3) and (i, 4), and a value may be assigned according to whether each user chooses each question-choice item.

For example, E (i, j) refers to choice item j of question i and Y' (u, E) refers to whether user u chooses choice item j of question i. According to an embodiment of the present invention, 1 may be assigned when user u chooses choice item j, and 0 may be assigned when user u does not choose choice item j.

Further, the data analysis server may configure a multi-dimensional space with a user and a question-choice item, assign values to the multi-dimensional space based on whether the user chooses the corresponding question-choice item, and calculate a vector for each user and question-choice item.

Thereafter, the data analysis server may estimate the probability of choosing a predetermined question-choice item by a predetermined user based on the user vector and the question-choice item vector, that is, a selection rate, in step 150.

At this time, the selection rate may be estimated by applying various algorithms to the user vector and the question-choice item vector, and the algorithms for calculating the selection rate are not to be limited in interpreting the present invention.

For example, according to an embodiment of the present invention, the user's question-choice item selection rate may be estimated by applying a sigmoid function like Equation (1) below (x denotes a question-choice item vector and Θ denotes a user vector).

$$h\Theta(x)=1/(1+e(-\Theta^{*}T^{*}X)) \quad \text{Equation (1)}$$

The data analysis server according to an embodiment of the present invention may estimate the correct answer rates of questions based on the user's choice item selection rate in step 160.

However, for example, when the choice item selection probability of a particular user for a particular question having four choice items is (0.5, 0.1, 0.3, 0.6) and the choice item corresponding to the correct answer is no. 1, the probability that the user solves the question becomes a problem. That is, a method of estimating a correct answer rate of the corresponding question may be considered based on a plurality of choice item selection rates for the corresponding question.

As a simple method of returning the choice item selection rate to the correct answer rate according to an embodiment of the present invention, there is a method of comparing the selection rates of all choice items and the selection rate of the correct answer. In this case, in the above example, the correct answer rate of the corresponding user for the corresponding question may be calculated as 0.5/(0.5+0.1+0.3+0.6). However, when solving the question, the user does not divide the corresponding question in the unit of choice items to understand the question, but understands the question in the unit of questions including the configuration of all choice items and the intention of a person who makes questions, so that a choice item selection rate and a correct answer rate cannot be simply connected.

Accordingly, it is possible to estimate the correct answer rate of the corresponding question from the choice item selection rates through a method of averaging all choice item selection rates of the corresponding question and applying an averaged correct answer selection rate to all choice item selection rates according to an embodiment of the present invention.

In the above example, when the choice item selection probability corresponds to (0.5, 0.1, 0.3, 0.6), the scale of the choice item selection rate may be changed to (0.33, 0.07, 0.20, 0.40) by averaging the choice item selection probability with respect to all choice items. When the correct answer is no. 1, the averaged selection rate of choice item no. 1 is 0.33, the all choice item selection rates is ((0.5+0.1+0.3+ 0.6), and thus the correct answer rate of the corresponding user for the corresponding question may be estimated as 0.33/(0.5+0.1+0.3+0.6).

Further, the service server according to an embodiment of the present invention may estimate a correct answer rate of the question based on the question-choice item selection probability of the user, and may estimate understanding by the user of a particular concept therethrough.

In addition, the data analysis server may calculate a learning efficiency of the corresponding user for a particular question based on the selection rate of each choice item of the question in step 165.

The data analysis server according to an embodiment of the present invention may calculate the choice item selection probability of the question for each user and a correct answer probability of the corresponding user for each question based on the modeling vector in the unit of choice items of the question and the user modeling vector as described above. Based on the above, when a particular user selects the corresponding choice item with the choice item selection probability of a predetermined question, the data analysis server according to an embodiment of the present invention may calculate a learning efficiency of the corresponding question by applying an average value of correct answer change values of another question.

For example, user A may have a1 as a selection rate for a first choice item of particular question a, a2 as a selection rate for a second choice item, a3 as a selection rate for a third choice item, and a4 as a selection rate for a fourth choice item.

At this time, when it is assumed that user A selects the first choice item for the corresponding question, a modeling vector of user A and modeling vectors of all questions may be somewhat changed through the application of a first choice item selection event of user A, and the correct answer rate of each question may be somewhat changed according to the changed modeling vectors. Accordingly, the data analysis server may calculate a correct rate change average value AVC_a1 of all questions by applying a virtual event for the selection of the first choice item of user A.

In the same way, the data analysis server may calculate AVC_a2 based on the assumption that user A selects the second choice item, calculate AVC_a3 based on the assumption that user A selects the third choice item, and calculate AVC_a4 based on the assumption that user A selects the fourth choice item.

Thereafter, the data analysis server may calculate a learning efficiency E(A, a) through question a of user A based on the following equation.

$$E(A,a)=a1*AVC\_a1+a2*AVC\_a2+a3*AVC\_a3+a4*AVC\_a4 \quad \text{Equation (2)}$$

The data analysis server may calculate E(A) for all questions and provide user-customized questions in the order of the question having the highest E(A) in step 170. That is, according to an embodiment of the present invention, it is possible to provide questions having the highest learning efficiency to a particular user.

Meanwhile, the data analysis server may recommend user-customized content based on at least one of a user vector, a question-choice item vector, a choice item selection rate, a correct answer rate of a question, understanding of a concept by a user, and configuration of a concept of a question in step 170.

For example, the service server may recommend that a user who does not understand a particular concept take an intensive course for the corresponding concept.

In another example, the service server may recommend that a user having a low correct answer rate for a question including all of a plurality of concepts attempt questions covering the plurality of concepts.

Further, except for questions that the user has already solved in the question database, the service server may arrange the remaining questions in the descending order of the correct answer rate of the question for a particular user, thereby creating a recommended question list for the corresponding user and providing the recommended question list.

For example, when a first row value of a user-question correct answer rate P corresponds to [0.3, 0.4, 0.1, 0.9, 0.7], the probabilities of user 1 solving questions 1, 2, 3, 4, and 5 may be analyzed as 30%, 40%, 10%, 90%, and 70%, respectively. The service server may provide the user with a question recommendation list in which priorities are assigned in the order of questions 3, 1, 2, 5, and 4. At this time, when user 1 has already solved question 5, the service server may make a question recommendation list excluding question 5.

Embodiments of the present invention disclosed in the specification and drawings are only particular examples for easily describing the technical content of the present invention and helping in understanding of the present invention, and do not limit the scope of the present invention. It will be apparent to those skilled in the art that not only the embodiment disclosed herein but also other modified embodiments based on the technical idea of the present invention can be implemented.

What is claimed is:

1. A method of operating a machine-learning framework for providing user-customized learning content via a service server, the method comprising:
configuring a question database including one or more multiple-choice questions each having one or more choice items;
providing, via the question database, the one or more multiple-choice questions to a respective user device of each of a plurality of users;
receiving, at the service server, choice item selection data of the plurality of users for each of the one or more multiple-choice questions from the respective user devices, the choice item selection data including choice items selected respectively for each of the one or more multiple-choice questions by each of the plurality of users;
performing data analysis on the choice item selection data for each choice item of each of the one or more multiple-choice questions;
configuring a list of values for each of a plurality of question-choice items for each of the plurality of users, wherein each question-choice item of the plurality of question-choice items is indicative of a respective question of the one or more multiple-choice questions and a respective choice item of the respective question, wherein the value is assigned based on whether the respect choice item for the respective question is selected by a respective user of the plurality of users;
configuring a multi-dimensional space including one or more vectors, wherein each of the one or more vectors is indicative of a respective question-choice item for each respective user of the plurality of users;
assigning values to one or more vectors of the multi-dimensional space based on the list of values;
calculating a selection rate for each question-choice item, wherein the selection rate is a probability that a given user will choose a respective choice item for a given question of the one or more multiple-choice questions;
calculating correct answer rates for each of the one or more multiple-choice questions based on the selection rate for each choice item of each of the one or more multiple-choice questions for the given user, wherein calculating the correct answer rates further comprises:
calculating an average value of selection rates for each of the one or more multiple-choice questions; and
applying an averaged probability of a correct answer to the selection rates of each of the one or more multiple-choice questions;
excepting for answered questions of the one or more multiple-choice questions that the user has already solved in the question database, arranging unanswered questions of the one or more multiple-choice questions that the user has not already solved in the question database in a descending order of the correct answer rates of the one or more multiple-choice questions for the user; and
creating and displaying a recommended question list of the one or more multiple-choice questions for the user based on the correct answer rates of the one or more multiple-choice questions.

2. The method of claim 1, further comprising:
responsive to a selection by the user of a first choice item for a first question of the one or more multiple-choice questions, calculating a first correct answer rate change average value of the one or more multiple-choice questions based on the selection of the first choice item by the user;
calculating a learning efficiency of a second question of the one or more multiple choice questions for the user, wherein the learning efficiency is based on probabilities of choosing respective choice items of the second question and the first correct answer rate change average value of the one or more multiple-choice questions; and
excepting for answered questions of the one or more multiple choice questions that the user has already solved in the question database, arranging unanswered questions of the one or more multiple choice questions that the user has not already solved in the question database in decreasing order of learning efficiency of each of the unanswered questions; and creating a recommended question list for the user based, at least in part, on the learning efficiency of each of the unanswered questions.

* * * * *